United States Patent [19]

Krammer et al.

[11] 4,042,101
[45] Aug. 16, 1977

[54] ACCUMULATING CONVEYOR

[75] Inventors: Robert Krammer, Farmington, Mich.; Michael T. McClellan, St. Paul, Minn.

[73] Assignee: Standard Conveyor Company, North St. Paul, Minn.

[21] Appl. No.: 628,797

[22] Filed: Nov. 4, 1975

[51] Int. Cl.² .............................................. B65G 13/02
[52] U.S. Cl. .................................. 198/460; 198/781; 198/783
[58] Field of Search ................... 198/127 R, 37, 460, 198/781, 782, 783, 790; 193/35 A, 35 B

[56] References Cited

U.S. PATENT DOCUMENTS

| | | | |
|---|---|---|---|
| 1,663,987 | 3/1928 | Jamieson | 198/127 R |
| 1,695,075 | 12/1928 | Zimmerman | 193/35 A |
| 2,134,373 | 10/1938 | Parker | 193/35 A |
| 2,182,756 | 12/1939 | Eggleston | 193/35 B |
| 2,827,153 | 3/1958 | Olk et al. | 198/127 R |
| 3,012,652 | 12/1961 | Poel et al. | 198/127 R |
| 3,040,872 | 6/1962 | Hohl | 198/127 R |
| 3,253,697 | 5/1966 | De Good et al. | 198/127 R |
| 3,266,617 | 8/1966 | Forsyth et al. | 198/127 R |
| 3,612,247 | 10/1971 | Pipp | 198/37 |
| 3,659,696 | 5/1972 | Denton et al. | 198/127 R |

*Primary Examiner*—Evon C. Blunk
*Assistant Examiner*—Douglas D. Watts
*Attorney, Agent, or Firm*—Harness, Dickey & Pierce

[57] ABSTRACT

An accumulating live roller conveyor in which articles of different sizes and weights may be stopped when movement of a lead article is blocked. The accumulation is in cascading fashion, and release may either be cascading or simultaneously. The conveyor comprises a series of article-supporting rollers with a powered endless belt having a driving run over one side of said rolls. A plurality of frames fitted with pressure rolls are disposed above the belt, one or more frames corresponding to an accumulation zone. Normally, the rolls hold the belt in driving contact with the article-supporting rollers. A plurality of sensing rolls are each connected to a frame in an upstream zone so that an article engaging a sensing roll will hold the corresponding frame in an upper position, eliminating belt pressure in that zone to stop an article. Following articles will be likewise stopped. In a preferred embodiment, the pressure rolls are eccentrically mounted to create oscillating frame motion when driving; the sensing roll in this embodiment is connected to the frame by lost motion means.

21 Claims, 15 Drawing Figures

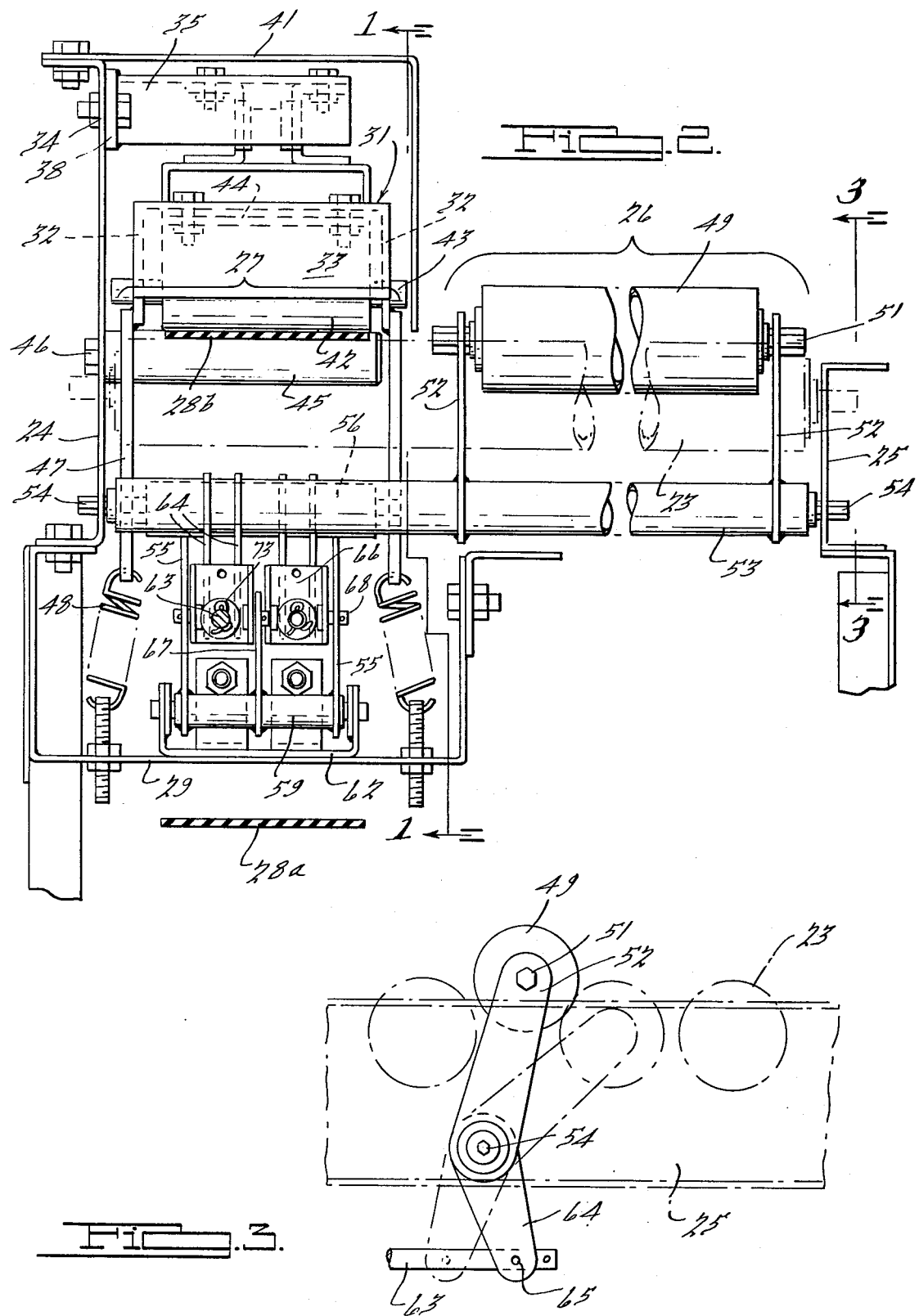

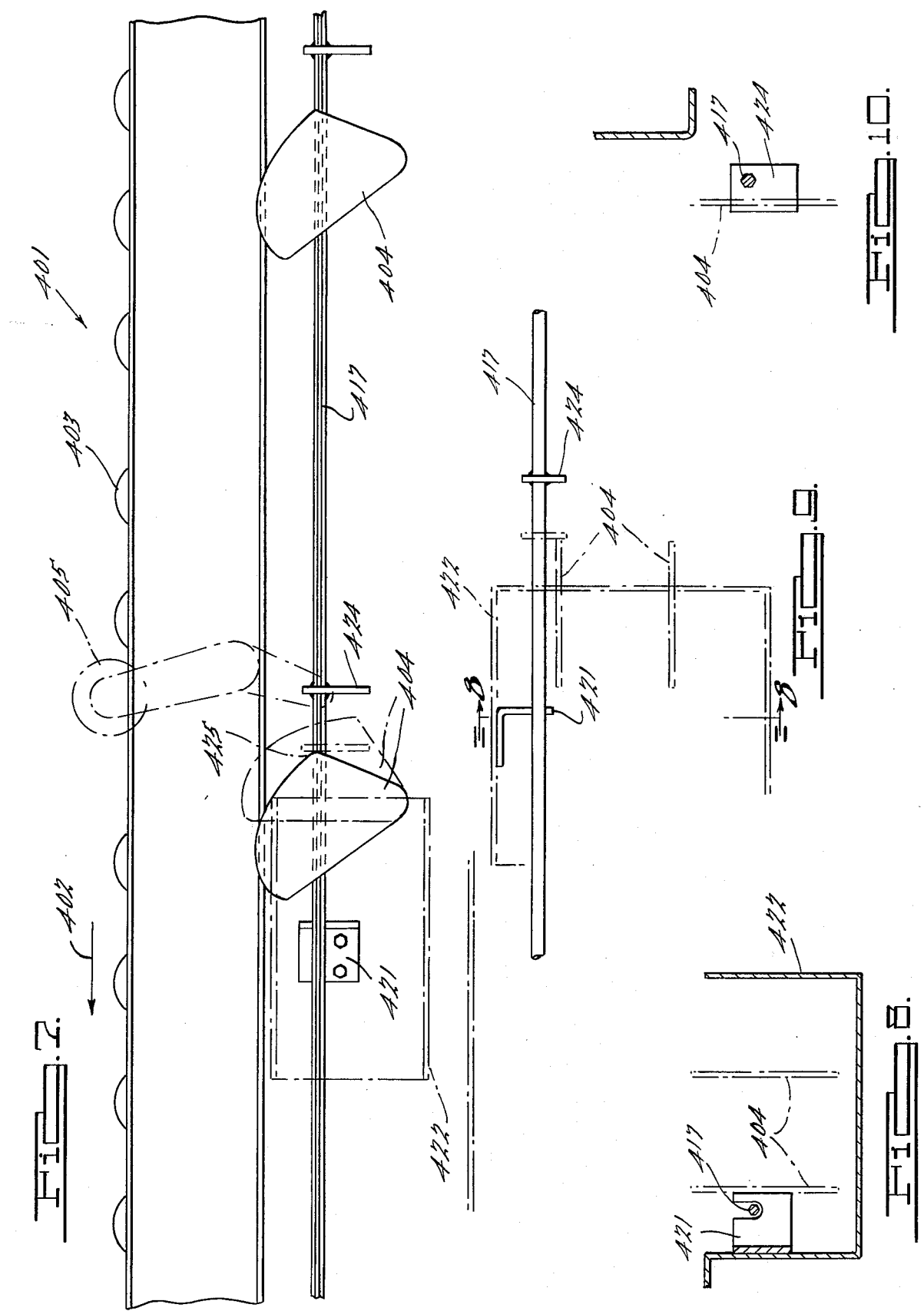

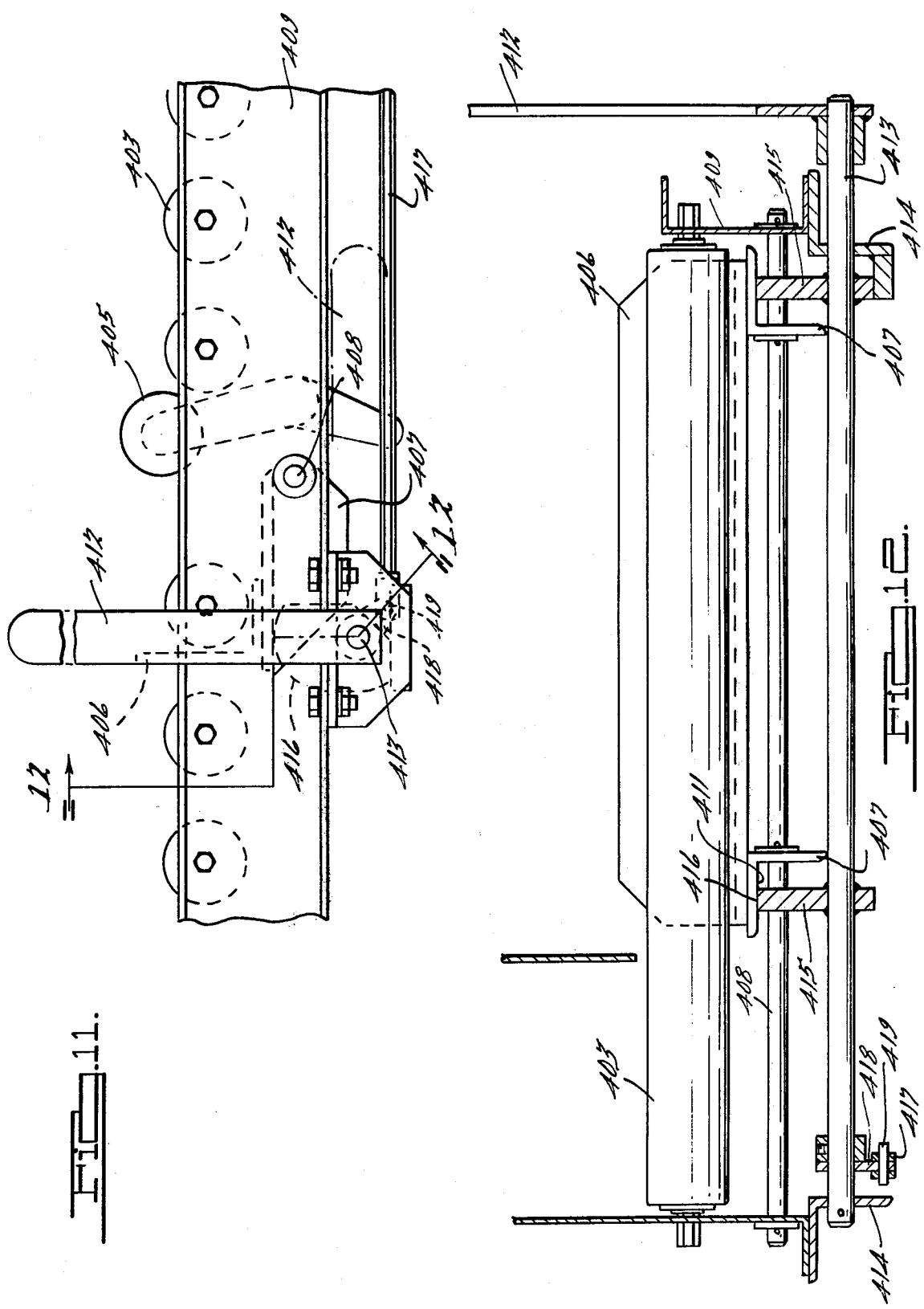

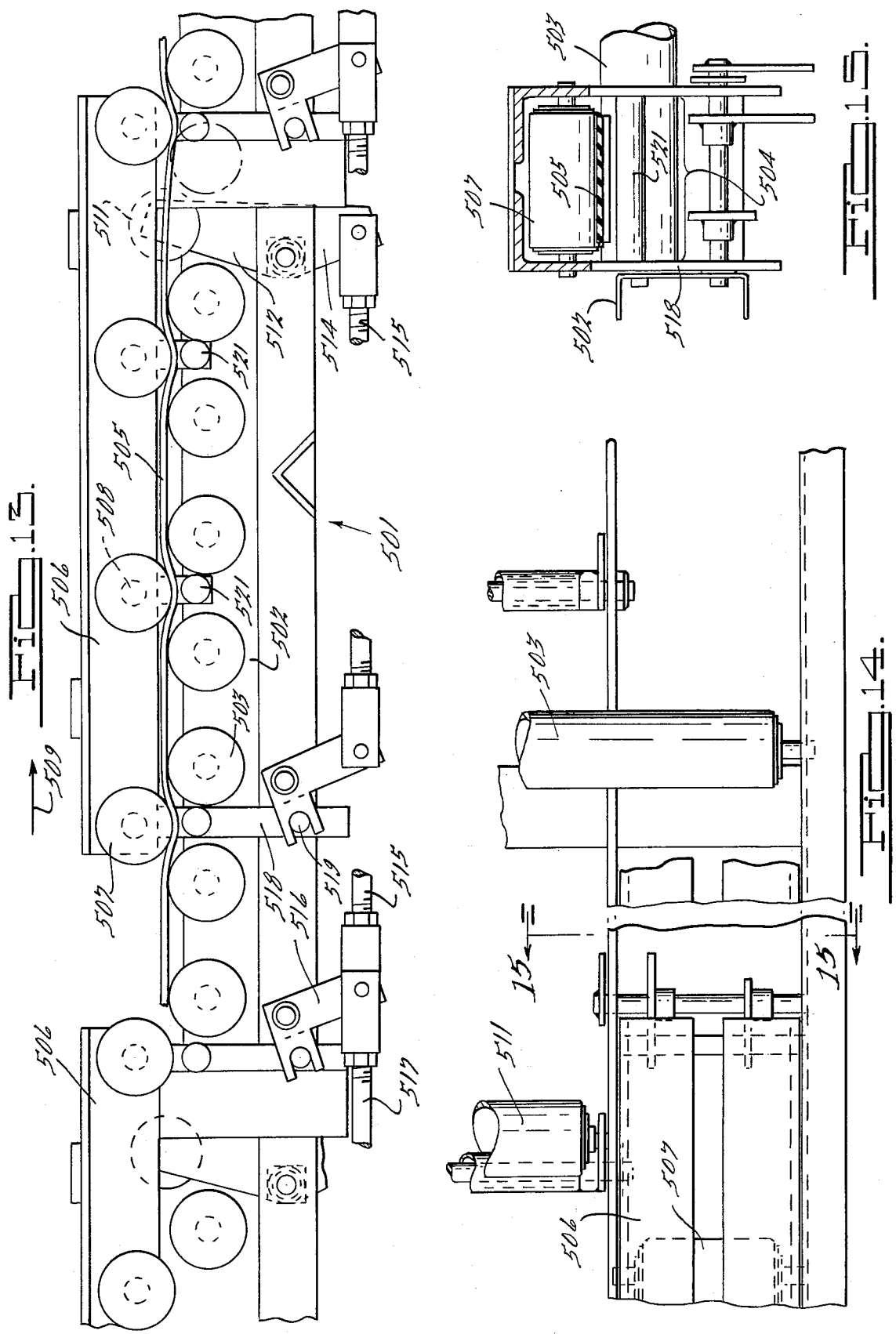

ACCUMULATING CONVEYOR

BACKGROUND OF THE INVENTION

1. Field of the Invention

The invention relates to accumulating live roller conveyors in which articles proceeding in single file are stopped when a lead article is obstructed. The invention particularly pertains to conveyors of this type in which the accumulating articles either do not touch each other or touch each other with minimal pressure and the conveyor exerts no effective propelling force on most of the accumulated articles. This may be referred to as "a zero pressure accumulating conveyor." The invention also pertains to accumulating conveyors which have belt driven powered rollers. Moreover, the invention is of the type in which the power to operate the accumulation process is taken from the moving belt itself without any additional outside power source. The accumulating components are thus "mechanically operated" rather than power operated by an outside source such as compressed air.

2. Description of the Prior Art

Typical of the patents which disclose belt driven live roller accumulating conveyors in Poel et al. U.S. Pat. No. 3,012,652 in which the driving belt is beneath the article-supporting rollers. Another belt driven powered roll conveyor is shown in Olk et al. U.S. Pat. No. 2,827,153. These patents show various means for adjusting the pressure rollers for the belt. In Pipp U.S. Pat. No. 3,612,247, the article-supporting rollers are yieldingly biased upwardly out of contact with the driving belt and are pressed thereagainst by the articles, sensing devices causing expansible chambers to hold the rollers out of engagement with the belt when movement of the lead article is interrupted. A patent showing eccentric rollers for accumulating articles but without sensors or accumulating zones, in Forsyth et al. U.S. Pat. No. 3,266,617. De Good et al. U.S. Pat. No. 3,253,697 shows eccentric pressure rollers beneath a belt in accumulating zones which are stopped by sensors, the system operating on a different principle than that of the present invention.

BRIEF SUMMARY OF THE INVENTION

It is an object of the present invention to provide a belt driven live roller accumulating conveyor with zero accumulating pressure, which overcomes disadvantages of previously known accumulating conveyors of this general type, has mechanically operated accumulating components, and is capable of conveying and accumulating articles of different sizes or weights in an efficient manner with a minimum of damage to the articles and without excessive wear on the conveyor parts.

It is another object to provide an improved accumulating conveyor of this type which may release the articles at measured intervals, or in another embodiment, release an accumulated train all at once.

It is a further object, in some embodiments of the invention, to provide an improved accumulating conveyor of this type in which the dynamic action of the pressure rolls in such as to create an extra driving force on the article-supporting rollers, thus permitting the driving frame and eccentric roll assembly to be lighter in weight for a given capacity, as compared to a steady state device.

It is also an object, in some embodiments, to provide an improved accumulating conveyor of this nature which, because it minimizes the force requirements on the sensing roll when moving to its accumulating position, makes it easier for relatively light articles to be transported and accumulated by the conveyor.

It is another object to provide an accumulating conveyor which in some cases may be fabricated by adding additional equipment to an existing conveyor.

Briefly, the invention comprises an accumulating conveyor having a series of rotatable elements forming an article-supporting surface, a powered propelling member above one side of said surface, accumulating means above said propelling member movable between a lower driving position in which it exerts downward pressure on said propelling member against said elements, and an upper accumulating position in which said pressure is relieved, and retractable means for holding said accumulating means in its accumulating position.

In a preferred embodiment, the invention comprises an accumulating conveyor as aforesaid, in which said holding means comprises a sensing element disposed above said surface in the path of articles conveyed thereon, means for constantly oscillating said accumulating means between its positions, and lost motion means connecting said accumulating means to said sensing element and responsive to engagement of said sensing element by an article for moving from a retracted position to an accumulating position in which it prevents said accumulating means for returning to its driving position.

According to this embodiment of the invention, the accumulating means comprises a frame, and the means for constantly oscillating the accumulating means comprises a plurality of rollers eccentrically mounted on said frame.

BRIEF DESCRIPTION OF THE DRAWINGS

FIG. 2 is an end elevational view of the invention, parts being broken away and sectioned for clarity;

FIG. 3 is a detailed elevational view of a sensing roll and its bell crank;

FIG. 7 is a side elevational view showing a portion of a modified form of the invention for the simultaneous release of articles;

FIG. 8 is a fragmentary cross-sectional view in elevation taken along the line 8—8 of FIG. 9 and showing guide means for the cam actuating rod;

FIG. 9 is a fragmentary plan view showing the manner in which the cams are actuated;

FIG. 10 is a fragmentary elevational view showing the engagement of a cam by a cam actuator;

FIG. 11 is a fragmentary side elevational view showing the stop bar handle and its associated elements;

FIG. 12 is a cross-sectional view in elevation taken along the line 12—12 of FIG. 11 and showing further details of the stopping mechanism.

FIG. 13 is a fragmentary side elevational view showing another embodiment of the invention in which the pressure rolls are concentrically mounted and the pressure roll frame is urged downwardly by gravity alone;

FIG. 14 is a top plan view of the embodiment of FIG. 13 taken along the line 14—14 thereof; and FIG. 15 is a front cross-sectional view taken along the line 15—15 of FIG. 14.

DESCRIPTION OF THE PREFERRED EMBODIMENTS

Figure 1:
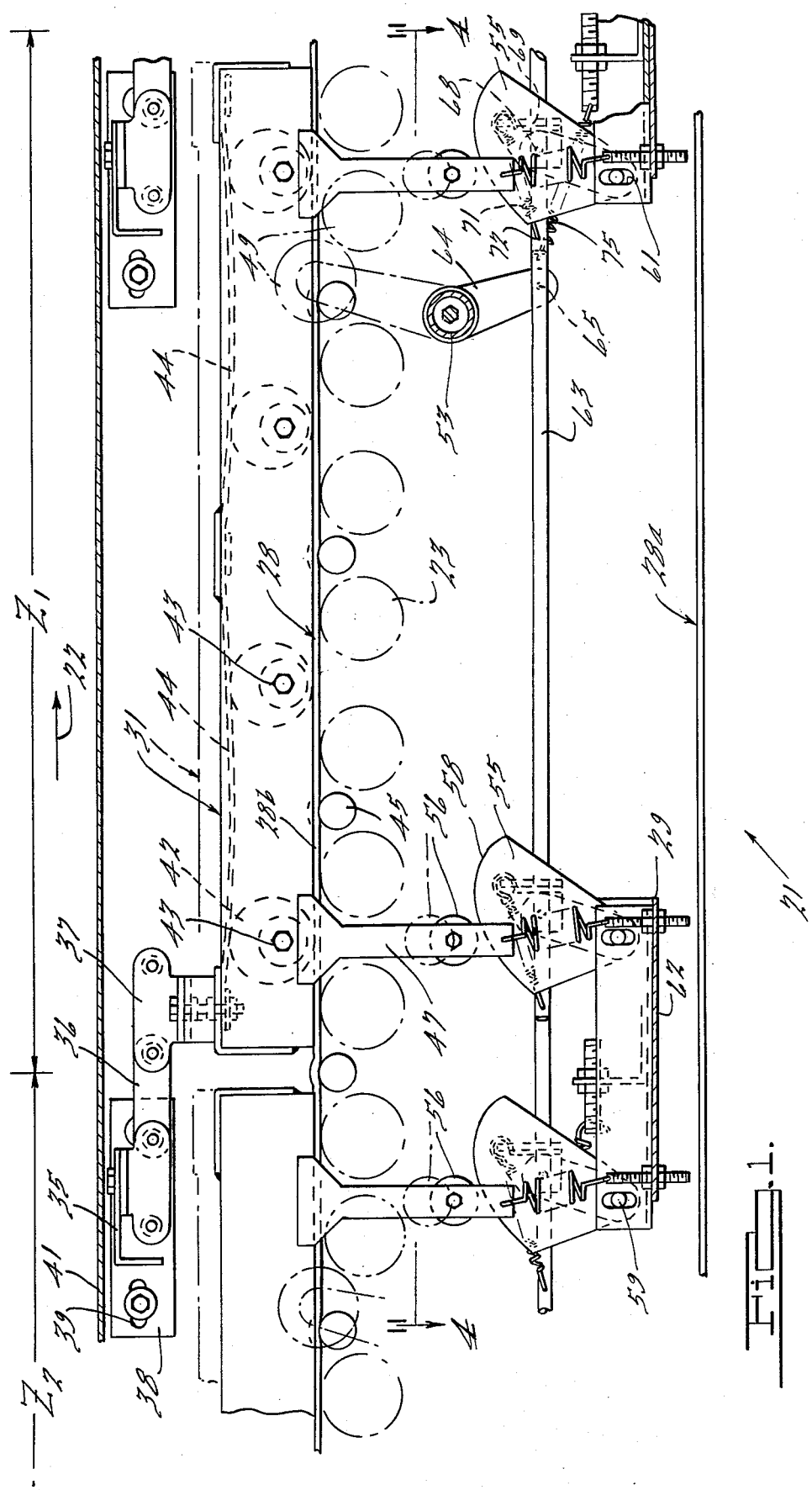
FIG. 1 is a side elevational view of a preferred embodiment of the invention as applied to a portion of a conveyor and showing one accumulating zone and part of another, taken along the line 1—1 of FIG. 2.

Referring first to the embodiments of FIGS. 1-4, the conveyor is generally indicated at 21 in FIG. 1 and is intended to transport articles (not shown) in the direction indicated by arrow 22. Only a portion of the conveyor is shown in order to illustrate various components. The conveyor may be considered as divided into a number of accumulating zones along its length, two such zones being indicated by the distances $Z_1$ and $Z_2$ in FIG. 1.

A series of rollers 23 are rotatably supported for free rotation between frame members 24 and 25 and together form an article-supporting surface along which the articles will be transported. A major portion of these rollers, indicated by the bracket 26 in FIG. 2, is used to support the articles. Side portions 27 of the rollers are used to control their driving or accumulating action.

Propelling means in the form of an endless driving belt generally indicated at 28 is provided for rotating rollers 23. Belt 28 extends between two end pulleys (not shown) and is power driven. The lower run 28a of the belt is below a frame portion 29 which supports components of the invention described below. Upper run 28b of the belt is disposed above portions 27 of rollers 23 and moves in the direction of arrow 22.

Accumulating means is provided for each zone Z movable between a driving position in which belt run 28b is held in frictional driving relation with rollers 23, and an accumulating position in which the belt flight is relieved of such pressure. The accumulating means for each zone Z comprises a movable frame generally indicated at 31, this frame being of rectangular shape and having side walls 32 and end walls 33. The frame is disposed above belt run 28b. The rearward end of frame 31 is secured to a stationary frame portion 34 by an anchor 35 which is connected to the frame by a pivotal link 36 and a bracket 37. Anchor 35 is adjustably mounted on frame portion 34 for limited longitudinal movement by means of a bracket 38 and a pin-and-slot connection 39. A shield 41 is secured to frame portion 34 and extends partially around frames 31.

Because of its articulated mounting, frame 31 is capable of vertical oscillating movement between a lower driving position shown in solid lines in FIG. 1 and an upper accumulating position shown partially in dot-dash lines. A plurality of pressure rolls 42 are rotatably mounted on eccentric axes 43 within frame 31, the rolls extending between side walls 32 thereof. As illustrated, four such rolls are shown as being located between alternate pairs of article-supporting rollers 23. The locations of axes 43 are such that the rolls 42 are rotatable between lower positions in which portions extend below the lower edge of frame 31, and upper positions in which the lower portions of the rolls are at or above the level of the bottom of the frame. Means are provided for releasably holding each roll 42 in its upper position, the means illustrated in FIGS. 1 to 4 being of festooned belts 44 fastened at intervals beneath the top of frame 31. The arrangement is such that as a roll 42 approaches its upper position, its upper surface will frictionally engage an adjacent portion of a festooned belt which will tend to hold it in that upper position. However, if frame 31 is not being held in its upper or accumulating position, as described below, the friction which occurs between belt run 28b and the lower portion of roller 42 will cause the roller to continue its rotation (counterclockwise in FIG. 1) past its detained position.

While there will be a slight gap between the roll 42 when in its FIG. 1 position and belt run 28b when frame 31 is held in its accumulating position, because of the force of gravity acting on the belt, downward movement of the frame to its driving position will eliminate this gap so that the moving belt will rotate the rolls.

A plurality of cylindrically shaped lifting bars 45 are secured at one end to frame portion 34 by bolts 46 and extend under belt run 28b. The level of the upper portions of the bars is slightly above the article-supporting surface formed by rollers 23. Bars 45 are located between alternate pairs of rollers 23 and between pressure rolls 42. When frames 31 are in their lower or driving position, pressure rolls 42 will depress the main portions of belt run 28b below the level of the tops of bars 42 so that the belt drives rollers 23. However, when a frame 31 is retracted to its upper accumulating position and the driving pressure has been removed from the belt, the belt will be lifted from the surface of rollers 23 by bars 45 and the natural tension in the belt run.

Means are provided for augmenting the weight of each frame 31 to urge it downwardly against the belt. As illustrated in FIGS. 1 to 4, this means comprises a pair of brackets 47 adjacent each end of the frame, these brackets extending downwardly from the frame sides and being connected by adjustably mounted tension springs 48 with conveyor frame portion 29. The driving capacity of the unit could be extended by adding suitable weights to frame 31.

Each frame 31 is associated with sensing means in the form of a sensing roll 49 which will be actuated by the presence of an article depressing the sensing roll from a sensing position shown in dot-dash lines in FIG. 1 to an actuating position shown in double dot-dash lines. Preferably, a sensing roll 49 at any given location along the conveyor will control accumulation in a zone Z which is located upstream of the zone in which the sensing roll is disposed. For example, the sensing roll 49 shown in zone $Z_1$ in FIG. 1 will control the frame 31 in zone $Z_2$. The roll is in a gap between rollers 23.

Each sensing roll 49 is supported in the path of moving articles by a pivot axis 51 supported by arms 52. These arms are secured to a rockshaft 53 which is in turn supported on pivots 54 by the conveyor frame. The length of each roll 49 may be somewhat less than the length of portion 26 of article-supporting rollers 23, while shaft 53 extends under portions 27 of rollers 23. If desired, counterweights (not shown) could be provided for the sensing roll 49 to make it more sensitive. It should be observed that when the sensing roll is actuated, it becomes part of the roller bed so that no undesirable gaps appear in the bed. Roll 49 is preferably supported by a positive stop (not shown) so as to become one of the load carrying rollers.

The means for holding each frame 31 in its upper or accumulating position comprises two pairs of cams 55 which are mounted below and adjacent two cam engaging bars 56, each bar extending between the lower ends of a pair of brackets 47. Each cam 55 has a curved upper edge 58 and a narrower lower end carrying a pin 59. This pin is mounted at its ends in slots 61 formed in the side walls of a U-shaped bracket 62 so that the cams may move vertically to a limited extend. Curved edges 58 vary in distance from pins 59, the left-hand portions of the edges in FIG. 1 being lower than the right-hand portions. When a pair of cams 55 is in its clockwise position as shown in solid lines in FIG. 1, a corresponding bar 56 will be allowed to descend to its solid line or driving position. The exact location of bar 56 when in its driving position will be determined by a number of factors, including the softness of belt 28. Counterclockwise swinging of the cam, when permitted by a prior raising of bar 56 to its dot-dash line position, will hold the bar in its upper or accumulating position.

Lost motion means are provided for simultaneously actuating two pairs of cams 55 for the front and rear bars 56 of each frame 31 so that the oscillating frame will be prevented from returning from its accumulating to its driving position in response to actuation of its downstream sensing member by an article which is held against travel and therefore depresses the sensing member. This means comprises a rod 63 which extends from a point below the rockshaft 53 of each sensing member 45 to the preceding zone, the accumulating frame of which is controlled by that sensing member. A pair of downwardly extending arms 64 is secured to each rockshaft 53 beneath the driving portion 27 of rollers 23 and is pivotally connected at 65 to the forward end of rod 63.

Each rod 63 extends past the cams 55 at the forward and rearward ends of the frame 31 which it controls. A U-shaped bracket 66 is connected between one cam 55 of each pair and an intermediate bracket 67 on pivot 59. Bracket 66 is pivotally connected to cam 55 and arm 67 at 68 and has an aperture 69 through which rod 63 extends, thus serving as a guide for the rod. A spring 71 is connected between each bracket 66 and a point 72 on rod 63 upstream of that bracket. Thus, upstream movement of rod 63 will tension two springs 71 and urge their pairs of cams 55 counterclockwise as this is permitted by the next upward movement of bars 56. A cotter pin 73 extends through each rod rearwardly of the central portion of bracket 66, a washer 74 being disposed between this cotter pin and the bracket. A tension spring 75 is connected between the forward end of each rod 63 and a longitudinally adjustable fixed member 76. This tension spring will urge its rod 63 forwardly (to the right in FIGS. 1 and 4), thus causing cotter pins 73 to move brackets 66 and therefore cams 55 clockwise. This will permit bars 56 supported by the cams to descend. Spring 75 will also return sensing roll 49 to its sensing position.

In operation, articles will rest on rollers 23 and be moved along by the continual rotation of these rollers due to the moving belt run 28b being pressed thereagainst by pressure rollers 42. Normally at slower speeds, the articles will be spaced far enough apart so that when any given article is stopped in a position depressing a sensing roll 49, the succeeding article will not have entered the accumulating zone controlled by that sensing roll to an extent which will prevent it from being halted in said zone. At higher speeds the second article may have sufficient momentum to coast into the stopped article, and succeeding articles will do likewise. Whether the articles remain in close formation or are spaced apart will depend on various factors, such as the type of article bottom, coefficients of friction, and the kinetic energy of the articles.

Normally, in the non-accumulating mode, all cams 55 will be in their clockwise or solid-line position of FIG. 1, permitting springs 48 to hold frames 31 in their driving position. The moving belt 28 will continuously rotate rollers 23 and will also rotate pressure rolls 42 about their eccentric axes. Frame 31 will oscillate up and down between its solid and dot-dash line positions in FIG. 1 because of the eccentric mounting of rolls 42. This oscillation will not detract from the frictional driving contact between belt 28 and the article-supporting rollers because of the force of gravity, plus springs 48, which constantly urge the frame and its rolls downwardly. The driving efficiency of rollers 23 will be enhanced by the fact that they receive repeated torque impulses from the belt rather than steady forces. Each upward movement of frame 31, being accelerated against the force of gravity, will simulate a heavier weight on belt 28. Since the driving force on rollers 23 is proportional to the weight imposed on belt 28 by pressure rolls 41, frame 31 and the eccentric roll assembly may be made lighter when compared with the weight of a steady state device.

As each article reaches each sensing roll 49, it will momentarily depress this roll, thus shifting the corresponding rod 63 leftwardly so as to urge cams 55 clockwise. However, the spacing of the articles relative to the period of vertical oscillation of frames 31 is such that this momentary shifting will not affect the oscillating action of the frames nor the driving relationship between belt 28 and the article-supporting rollers. As each article passes a sensing roll 49, the roll will be returned to its upper position by the corresponding spring 75 which also returns rod 63 rightwardly and shifts cams 55 clockwise.

When it is desired to accumulate articles, a stop will be placed in obstructing relation with a given article so that the article holds a sensing roll 49 depressed. Rod 63 will be shifted to the left in FIG. 1, tensioning springs 71 connected to cams 55. If the tensioning takes place when bars 56 are in their upper position, cams 55 will swing to the left and hold the bars in this position. If, on the other hand, bars 56 obstruct cams 55, springs 71 will remain tensioned until the next upward movement of the bars, and will then move cams 55 counterclockwise. In any event, the accumulating zone Z immediately upstream from that in which the sensing roll is depressed will have its frame 31 held in its lifted position. The spinning eccentric rolls of that frame will come to rest with their thicker portions held by festooned belts 44, thus aligning themselves in a manner such that their thinner sides will extend downwardly toward the belt. Since belt run 28b has been lifted from the surface of article-supporting rollers 23 by bars 45, the belt will cease to contact rollers 23 in that zone, thus removing all driving forces on the rollers. While this arrangement is advisable for rollers which are handling lighter articles, heavier items could be handled satisfactorily even without bars 45, since the slight remaining driving force of the belt on rollers 23 would be ineffective to rotate the rollers.

It should be noted that the power which actuates the accumulation components of the conveyor is derived from the moving belt 28 itself without any auxiliary power source of being required. It will also be observed that the vertical oscillating movement created by the eccentric rolls makes it feasible to have the cams and thereby minimizes the force required on the sensing rolls to move the cams to their holding position with respect to the frames.

When the article following that which has depressed the sensing roll 49 enters the zone Z which has been placed in an accumulation mode, it may stop before reaching the sensing roll 49 in that zone. However, the following article will push the stopped article further into the de-activated zone so as to depress the sensing roll in that zone. This will in turn de-activate the zone directly behind it, the process being repeated in cascading fashion for the whole length of the accumulating conveyor. If desired, one or two constantly driven rollers 23 could be placed between accumulating zones in which case each article to be accumulated would be driven onto a sensing roll to de-activate the zone behind it.

When it is desired to cease the accumulation mode, the stop holding the first article will be retracted from its obstructing position. Since the zone in which this article has been held is in a driving rather than an accumulating mode, the article will proceed past the depressed sensing roll 49 which will return by means of spring 75 to its elevated position. Rod 63 being shifted to the right by this spring, will swing cams 55 clockwise for the preceding zone allowing its frame 31 to drop into driving position. Again, the article in that zone will be driven past its sensing roll and the process will be repeated in a cascading manner.

Figure 5:
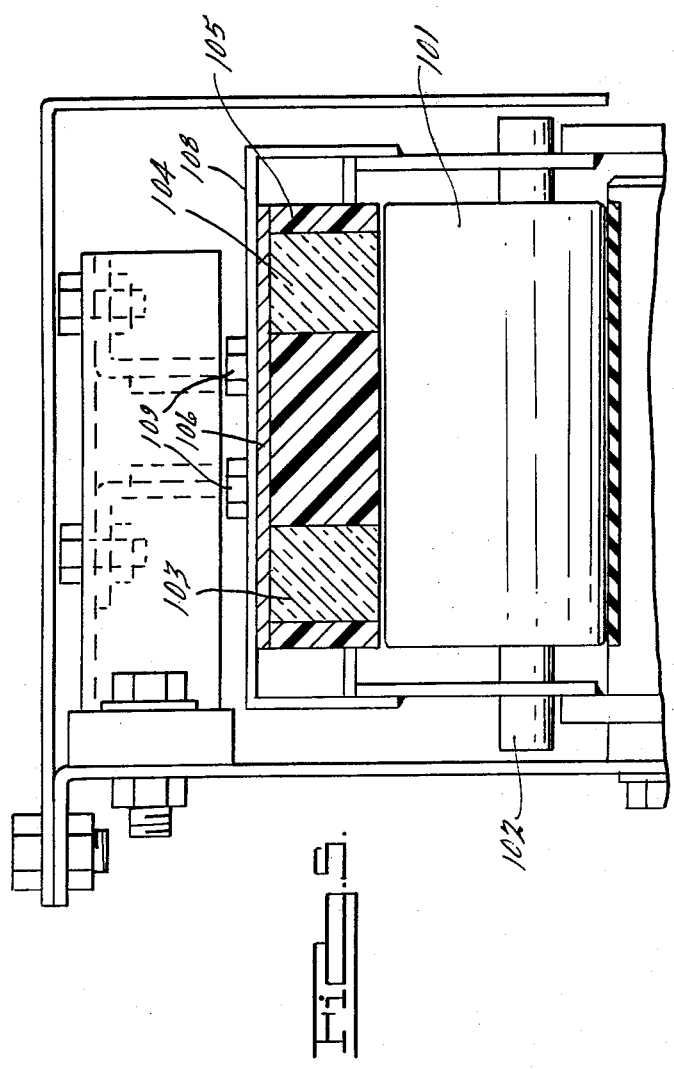
FIG. 5 is a fragmentary end elevational view showing an alternative form of the pressure rolls and their retaining means embodying the use of magnets.
Figure 4:
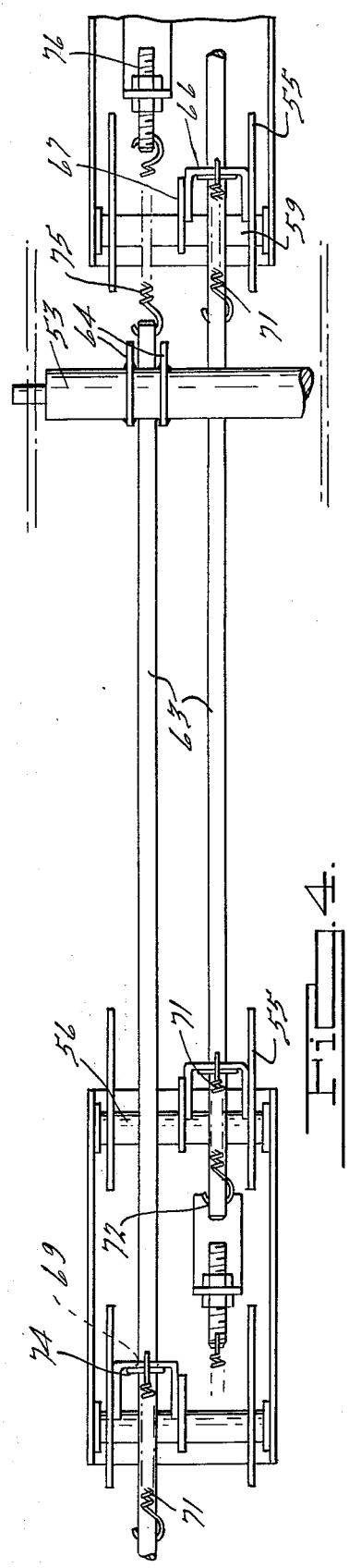
FIG. 4 is a top plan view of the cam actuating means taken along the line 4—4 of FIG. 1, parts being omitted for clarity.

FIG. 5 shows an alternative construction for the eccentric pressure rolls and their retaining means, which could be used in place of the festooned belts shown in the embodiment of FIGS. 1 to 4. As illustrated, the pressure roll is indicated at 101 and has an eccentric axis 102. The roll is fabricated of magnetically permeable material such as steel and a plurality of magnets 103 and 104 are mounted above the roll, being shown as ceramic magnets encapsulated in a material such as an epoxy 105. This material could in some instances also act as a brake material to touch the roll on the thicker side, thus slowing down the rotation and facilitating the development of the magnetic field. Suitably, a cold finished bar 106 is connected to the backs of each pair of magnets 103 and 104 so that the north and south poles will develop, the bar having intimate contact with the magnet surfaces. The magnet assembly is shown as being mounted on a frame 107 by an inverted U-shaped bar 108 and bolts 109.

Figure 6:
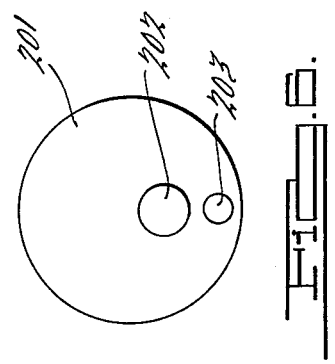
FIG. 6 is a fragmentary side elevational view of another embodiment of the pressure rolls and retaining means in which the pressure rolls are counterweighted.

FIG. 6 shows still another embodiment of the roll indicated at 201 and mounted on an eccentric axis 202. A counterwieght 203 is embedded in the relatively thin portion of roll 201 so that the roll will be yieldably held in a position similar to that of the previous embodiments.

FIGS. 7 to 12 show another embodiment of the invention which is basically similar in many respects to that previously described but has an additional feature by means of which accumulated articles may be released simultaneously instead of in succession. The conveyor is generally indicated at 401 and is adapted to convey articles in the direction of the arrow 402 (FIG. 7). A plurality of article-supporting rollers 403 are provided, being driven by a belt which is contolled by pressure rolls as in the previous embodiment. The frames carrying the pressure rolls are, as before, capable of being held in their upper or accumulating position by cams 404 which are controlled by sensing rolls 405. The dot-dash line position of cams 404 permits dropping of the accumulating frame to its driving position, the double dot-dash position holding the frame in its accumulating mode.

The means for simultaneous release of articles comprises a stop 406 forwardly of a sensing roll 405 which is movable between an upright or stopping position as shown in FIG. 11, in which it is in obstructing relation with an article carried by rollers 403, and a retracted position. Stop 406 comprises an L-shaped member secured to brackets 407 which are pivotally mounted at 408 to the frame 409 of the conveyor. Two brackets 407 are provided as seen in FIG. 12, the brackets being L-shaped and having downwardly facing surfaces 411. Pivot 408 is to the right of stop 406 in FIG. 11 so that when support for brackets 407 is retracted, the brackets and stop 406 will swing counterclockwise about pivot 408 toward the retracted position.

A handle 412 is provided on one side of the conveyor, the inner end of the handle being fixed to a shaft 413 rotatably mounted on conveyor frame portions 414. Shaft 413 extends across the conveyor below brackets 407 and carries a pair of cams 415 secured thereto. These cams have curved surfaces 416 so shaped that when handle 412 is in its upper position in FIG. 11, the wider portion of cams 415 will engage surfaces 411, thus holding stop 406 in its stopping position. When handle 412 is swung clockwise to its dot-dash line position in FIG. 11, the narrower portions of cam surfaces 416 will face surfaces 411 of brackets 407, permitting the stop 406 to move to its retracted position.

A tie rod 417 is secured at its forward end to a crank 418 on shaft 413 by a pin-and-slot connection 419. This tie rod 417 extends rearwardly beneath the entire conveyor, being guided by apertured brackets 421 carried by conveyor frame portions 422. If desired, the left-hand end of bar 417 in FIG. 11 could be connected with a spring (not shown) to maintain its position during operation despite its length. A release dog 424 is secured to tie rod 417 behind one of each pair of cams 404 and extends laterally from the tie rod so as to be engageable with the rearward edge 425 of the cam, as seen in FIG. 7. When handle 412 is in its upper or solid line position of FIG. 11, dogs 424 will be in their solid line position of FIG. 7, thus permitting the sensing rolls and their associated elements to move the cams to their accumulating position as shown in double dot-dash lines. However, when handle 412 is swung to its dot-dash line position in FIG. 11, release dogs 424 will engage cams 425, swinging the cams counterclockwise to their driving position in which they permit the pressure roll frames to drop. Thus, all previously accumulated articles will be simultaneously released for movement. When the handle is again raised, accumulation will occur as in the previous embodiment, in cascading fashion from front to rear.

If desired, zones of simultaneous release functions could be combined with zones of sequential or cascading release functions on the same conveyor.

FIGS. 13, 14 and 15 show another embodiment of the invention similar to the previous embodiments but in which the pressure rolls are not eccentrically mounted and the pressure roll frame is urged against the driving belt by gravity alone. The conveyor is generally indicated at 501 and comprises side frame members, one of which is indicated at 502. A plurality of article-supporting rollers 503 are rotatably mounted between frame members 502. A major portion of each roller 503 supports articles, and a side portion indicated by the bracket 504 is driven by a belt 505.

A plurality of accumulating frames 506 are disposed over the upper run of belt 505 and each frame carries a series of pressure rolls 507. These rolls are pivotally mounted at their centers 508 and are disposed between the article-supporting rollers in a manner such that, when frame 506 is permitted to move downwardly by its own weight, rolls 507 will hold belt 505 against rollers 503 at their sides 504, causing rollers 503 to convey articles supported thereby in the direction of the arrow 509.

A plurality of sensing rolls 511 are disposed along the conveyor between certain rollers 503, the sensing rolls normally projecting above the surface formed by rollers 503 but being depressed by articles passing thereover. Each sensing roll 511 is rotatably mounted on a crank 512 secured at its lower end to a pivot 513 mounted on the conveyor frame. An arm portion 514 extends below pivot 513 and is pivotally connected to a rod 515 extending upstream to the next accumulating zone. More particularly, rod 515 is pivotally connected to one arm of a bell crank 516. An extension 517 of rod 515 leads to a second bell crank. The two bell cranks together are intended to actuate both ends of an accumulating frame 506. For this purpose, each frame 506 has a pair of downwardly extending arms 518 carrying pins 519 engageable with bell cranks 516.

A plurality of bars 521 are carried by frame 506 beneath the upper run of belt 505. These bars are adapted to engage the underside of this belt run when frame 506 is lifted so as to completely remove the belt from contact with rollers 503.

In operation of the embodiment of FIGS. 13 to 15, when the conveyor is in a driving mode, frames 506 will be in the position of the right-hand frame of FIG. 13; that is, with belt 505 drivably engaging rollers 503. However, if one article is stopped in a position depressing a sensing roll 511, the accumulating frame 506 connected to that sensing roll will be lifted by clockwise swinging of bell cranks 516. This will lift belt 505 from contact with the article-supporting rollers.

When it is desired to discontinue accumulation, the stop holding the article on the foremost sensing roll 511 will be removed. Since the zone in which this article is located is still in the driving condition, the article will pass over the sensing roll, permitting its corresponding frame 506 to drop by gravity to its driving position. The succeeding articles will thus also be moved along the conveyor.

While it will be apparent that the preferred embodiments of the invention disclosed are well calculated to fulfill the objects above stated, it wil be appreciated that the invention is susceptible to modification, variation and change without departing from the proper scope or fair meaning of the subjoined claims.

We claim:

1. In an accumulating conveyor, a series of rotatable elements forming an article-supporting path, a powered propelling member, accumulating means adjacent said propelling member movable between a driving position in which it exerts pressure on said propelling member against said elements and an accumulating position in which said pressure is relieved, said accumulating means comprising eccentrically mounted pressure rolls rotatable by said propelling member between a first rotational position in which their thicker portions face said propelling member and a second rotational position in which their thicker portions face away from said propelling member, a portion of said accumulating means supporting said rolls for bodily movement of said portion transversely to said propelling member in response to said rotary movement of said pressure rolls, whereby movement of said propelling member will cause continual oscillating movement of said accumulating means between its driving and accumulating positions, and retractable means movable into the path of said roll-supporting means only after said accumulating means has moved to its accumulating position for holding said accumulating means in its accumulating position to permit said driving pressure to be relieved.

2. A conveyor according to claim 1, further provided with releasable means retaining each pressure roll in its second rotational position.

3. A conveyor according to claim 2, said releasable retaining means comprising at least one festooned belt adjacent said rolls.

4. A conveyor according to claim 2, said pressure rolls being of magnetically permeable material, said releasable retaining means comprising at least one magnet for each pressure roll.

5. A conveyor according to claim 2, said releasable retaining means comprising counterweights in the thinner portions of said pressure rolls.

6. In an accumulating conveyor, a series of rotatable elements forming an article-supporting path, a powered propelling members, accumulating means adjacent said propelling member bodily movable transversely thereto between a driving position in which it exerts pressure on said propelling member against said elements and an accumulating position in which said pressure is relieved, and retractable means for holding said accumulating means in its accumulating position, said retractable means comprising cam means movable into obstructing relation with said accumulating means only when the accumulating means have moved to its accumulating position to prevent movement thereof to its driving position, means for actuating said cam means to its obstructing position, and a connection between said actuating means and said cam means.

7. A conveyor according to claim 6, said last-mentioned connection being a lost motion connection.

8. In an accumulating conveyor, a series of rotatable elements forming an article-supporting path, a powered propelling member, accumulating means adjacent said propelling member bodily movable transversely thereto between a driving position in which it exerts pressure on said propelling member against said elements and an accumulating position in which said pressure is relieved, retractable holding means for holding said accumulating means in its accumulating position, said holding means comprising a sensing element disposed above said surface in the path of articles conveyed thereon, means for constantly oscillating said accumulating means between its positions, and means connecting said accumulating means to said sensing element and responsive to engagement of said sensing element by an article for moving from a retracted position to an accumulating position in the path of said accumulating means only after the accumulating means has moved to its accumulating position in which it prevents said accumulating means from returning to its driving position.

9. In an accumulating conveyor, a series of rotatable elements forming an article-supporting path, a powered propelling member, accumulating means adjacent said propelling member bodily movable transversely thereto between a driving position in which it exerts pressure on said propelling member against said elements and an accumulating position in which said pressure is relieved, said conveyor having a plurality of longitudinally spaced accumulating zones, and accumulating means comprising individual units located in said zones, retractable holding means movable into the path of said accumulating means only after said accumulating means has moved to its accumulating position or holding said accumulating means in its accumulating position, said retractable holding means comprising a movable sensing member in one zone holdable in an accumulating position by an article stopped in said zone, means returning said sensing member from its accumulating position in response to release of said article, and means responsive to return of said sensing member for simultaneously retracting all of said holding means.

10. An accumulating conveyor comprising; a series of rotatable elements for supporting an article to be conveyed, said elements being disposed in side-by-side relationship along the path of the conveyor; a powered propelling member disposed above and adjacent one edge of said path; accumulating means including a frame disposed above said propelling member and being mounted for vertical movement with respect to said rotatable elements; a plurality of pressure rolls eccentrically mounted for rotation on said frame, said frame being normally disposed in a driving position in which said rolls rest upon and exert a downward pressure on said propelling member to cause it to drivingly engage said rotatable elements, said pressure rolls being rotatable by said propelling member when said frame is in said driving position to cause continual vertical oscillating movement of said frame between upper and lower positions; and retractable holding means for holding said frame in said upper position so that said propelling member does not drivingly engage said elements, thereby permitting the accumulation of articles on said conveyor.

11. A conveyor according to claim 10, said rotatable elements comprising rollers having article-supporting portions and driving portions at said one side, said powered propelling member comprising an endless belt having an upper run above said sides of said rollers.

12. A conveyor according to claim 10, further provided with releasable retaining means for retaining each of said eccentric pressure rolls in a position in which the rotational axis thereof is disposed below the center axis thereof.

13. A conveyor according to claim 12, said releasable retaining means comprising at least one festooned belt mounted on said frame and adapted to frictionally engage said pressure rolls.

14. A conveyor according to claim 12, said pressure rolls being of magnetically permeable material, said releasable retaining means comprising a magnet disposed adjacent said pressure rolls carried by said frame.

15. A conveyor according to claim 14, said magnet being embedded in a non-metallic material frictionally engageable with the portion of said pressure roll disposed furthest from its rotational axis.

16. A conveyor according to claim 12, said releasable retaining means comprising counterweights in said pressure rolls.

17. A conveyor according to claim 10, said frame carrying cam-engaging portions, said retractable holding means comprising cam means movably mounted below said cam-engaging portions and movable into obstructing relation therewith to prevent movement of the frame to its lower position, actuating means for actuating said cam means to its obstructing position, and a connection between said actuating means and said cam means.

18. A conveyor according to claim 17, said last-mentioned connection being a lost motion connection.

19. A conveyor according to claim 10, said retractable holding means comprising a sensing roll movably mounted slightly above said path downstream from said accumulating means, and a linkage connecting said sensing roll to said frame and actuatable in response to depression of the sensing roll by an article resting thereon to hold said frame in its upper accumulating position.

20. A conveyor according to claim 10, further provided with spring means constantly urging said frame in a downward direction.

21. A conveyor according to claim 10, said conveyor having a plurality of longitudinally spaced accumulating zones, a separate accumulating means and retractable holding means being located in each said zone, one of said retractable holding means comprising a movable sensing member in one zone holdable in an accumulating position by an article stopped in said zone, means for returning said sensing member from its accumulating position in response to release of said article, and means responsive to return of said sensing member for simultaneously retracting said holding means in all of said zones.

* * * * *

UNITED STATES PATENT AND TRADEMARK OFFICE
CERTIFICATE OF CORRECTION

PATENT NO. : 4,042,101
DATED : August 16, 1977
INVENTOR(S) : Robert Krammer and Michael T. McClellan It is certified that error appears in the above-identified patent and that said Letters Patent are hereby corrected as shown below:

| | |
|---|---|
| Column 1, line 25: | "in" should be --is-- |
| Column 1, line 38: | "in" should be --is-- |
| Column 1, line 62: | "in" should be --is-- |
| Column 2, line 30: | "for" should be --from-- |
| Column 5, line 9: | "extend" should be --extent-- |
| Column 6, line 26: | "41" should be --42-- |
| Column 9, line 56: | "wil" should be --will-- |
| Column 10, line 42 (Claim 6): | "have" should be --has-- |
| Column 11, line 9 (Claim 9): | "and" should be --said-- |
| Column 11, line 13 (Claim 9): | "or" should be --for-- |

Signed and Sealed this

Fifteenth Day of November 1977

[SEAL]

Attest:

RUTH C. MASON
Attesting Officer

LUTRELLE F. PARKER
Acting Commissioner of Patents and Trademarks